United States Patent [19]
Forget et al.

[11] Patent Number: 4,915,451
[45] Date of Patent: Apr. 10, 1990

[54] SAFETY BELT APPARATUS

[75] Inventors: Ken M. Forget; Mark F. Gray, both of Ontario, Canada

[73] Assignee: TRW Vehicle Safety Systems Ltd., Midland, Canada

[21] Appl. No.: 322,692

[22] Filed: Mar. 13, 1989

[51] Int. Cl.$^4$ .............................................. B60R 21/00
[52] U.S. Cl. ................... 297/468; 24/115 A; 280/801
[58] Field of Search ............. 297/468; 280/801; 403/199; 24/115 A, 115 K, 265 A, 115 H, 115 J, 129 W

[56] References Cited

U.S. PATENT DOCUMENTS

| | | | |
|---|---|---|---|
| 1,654,340 | 12/1927 | McIntosh | 24/115 A |
| 2,038,535 | 4/1936 | Brenizer . | |
| 4,119,344 | 10/1978 | Kondo | 297/468 |
| 4,199,190 | 4/1980 | Lindblad | 297/468 |
| 4,278,043 | 7/1981 | Heath | 280/801 |
| 4,402,114 | 9/1983 | Takagi | 24/265 R |
| 4,611,854 | 9/1986 | Pfeiffer | 297/468 |
| 4,645,231 | 2/1987 | Takada | 280/801 |
| 4,674,801 | 6/1987 | Di Paola et al. | 24/115 H |
| 4,775,126 | 10/1988 | Yokayama | 297/473 X |

FOREIGN PATENT DOCUMENTS 2003527 3/1979 United Kingdom ............. 24/115 K Primary Examiner—James T. McCall
Attorney, Agent, or Firm—Tarolli, Sundheim & Covell

[57] ABSTRACT

A seat belt system includes a cable for attachment of a seat belt buckle to a vehicle structure. The cable transmits forces from the buckle to the vehicle structure. The buckle has a base plate with a pair of facing channels. The cable has a loop intermediate its ends and parallel extending end portions. Opposite portions of the loop are located in the channels in the base plate. A member is attached to the base plate and located in the loop and has surface portions engageable with the loop. The channels retain the opposite portions of the loop against the member, and the member transmits forces acting on the buckle to the cable. An attachment plate connects the cable to the vehicle structure. The attachment plate has a channel with a bottom wall for receiving the end portions of the cable. A plurality of projections on the attachment plate clamp the end portions of the cable against the channel bottom wall to secure the cable to the attachment plate. The attachment plate is connected to the vehicle structure to transmit force from the cable through the attachment plate to the vehicle structure.

19 Claims, 4 Drawing Sheets

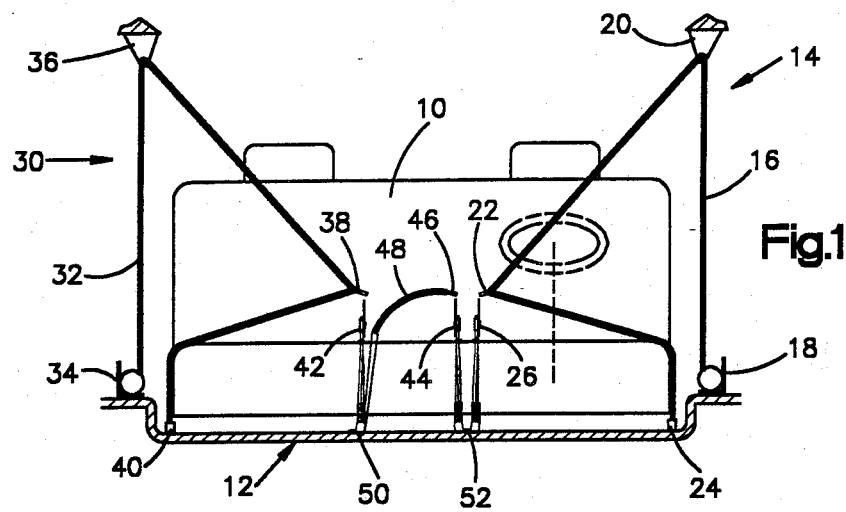
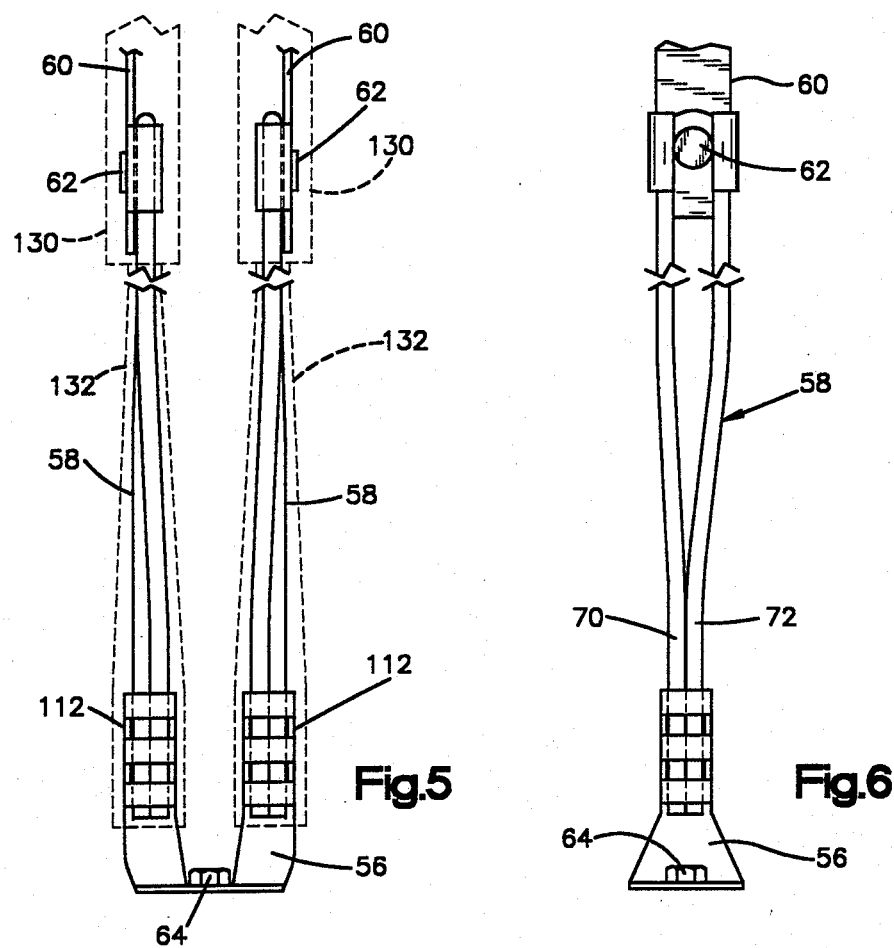
Fig.1
Fig.5
Fig.6

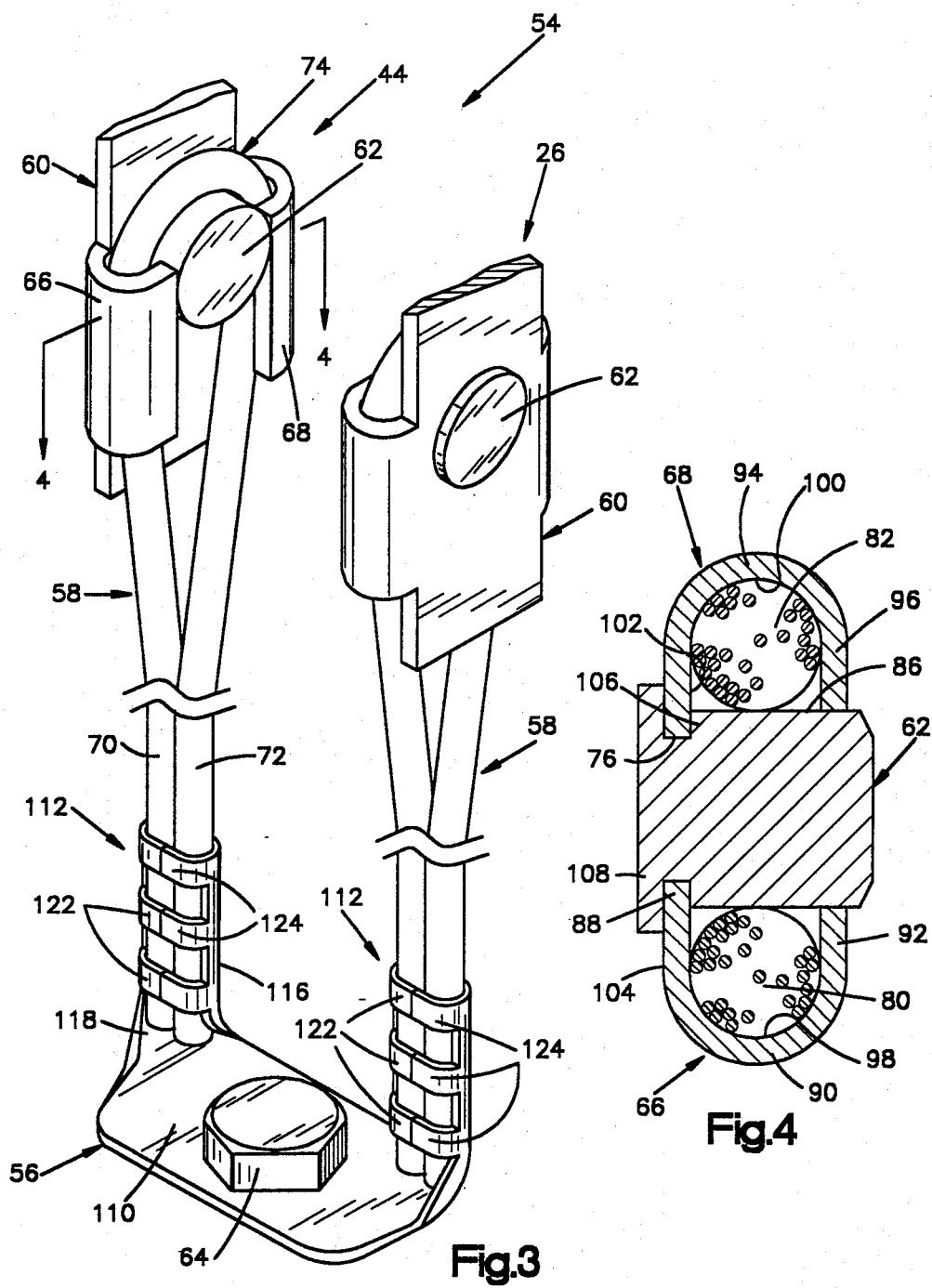

SAFETY BELT APPARATUS

BACKGROUND OF THE INVENTION

1. Technical field

The present invention relates to a seat belt system for restraining an occupant of a vehicle against movement relative to the vehicle. More particularly, the present invention relates to the attachment of a seat belt buckle to a vehicle structure to transmit forces from the buckle to the vehicle structure.

2. Prior Art

It is known to use a cable to attach a seat belt buckle to a vehicle structure. Lindblad U.S. Pat. No. 4,199,190 discloses a cable attaching a seat belt buckle to a vehicle structure. One end of the cable is fastened to the vehicle structure. The other end of the cable is fastened to the seat belt buckle. The cable supports the buckle relative to the vehicle structure and transmits forces from the buckle to the vehicle structure.

SUMMARY OF THE INVENTION

The present invention includes a cable for attaching a seat belt buckle to a vehicle structure. The seat belt buckle has a base plate. The base plate has flanges defining facing channels. The cable has a loop intermediate its ends and parallel extending end portions. Opposite portions of the loop are located in the channels in the base plate. A member is attached to the base plate and located in the loop and has surface portions engageable with the loop. The channels retain the opposite portions of the loop against the member. The member transmits forces acting on the buckle to the cable.

The present invention also includes an attachment plate for connecting the cable to the vehicle structure. The attachment plate has a channel for receiving an end portion of the cable. The channel has a bottom wall. A plurality of projections on the attachment plate clamp the end portion of the cable against the channel bottom wall to fixedly secure the cable to the attachment plate. The attachment plate may be fixedly connected to the vehicle structure to thereby transmit force from the cable through the attachment plate to the vehicle structure. In one embodiment of the invention, two end portions of the same cable are received in and clamped in the same channel.

The present invention also contemplates that an attachment plate may be connected to the buckle structure. This attachment plate also has a channel for receiving an end portion of a cable. The channel has a bottom wall. A plurality of projections on the attachment plate clamp an end portion of the cable to the bottom wall of the channel and thus attach the cable to the buckle structure. In such an embodiment of the present invention, a single cable strand would be used to attach the buckle structure to the vehicle structure as opposed to a double strand as in the embodiment in which the cable has a loop attached to the buckle structure.

BRIEF DESCRIPTION OF THE DRAWINGS

Further features of the present invention will become apparent to those skilled in the art to which the present invention relates from reading the following specification with ref to the accompanying drawings, in which:

FIG. 1 is a schematic front view of a vehicle seat having three occupant seating positions with occupant restraints;

FIG. 3 is a perspective view of the apparatus of FIG. 2;

FIG. 4 is a view taken along section line 4—4 of FIG. 3;

FIG. 5 is a front view of the apparatus of FIG. 3;

FIG. 6 is a front view of another embodiment of the invention; and

DESCRIPTION OF A PREFERRED EMBODIMENT

Figure 2:
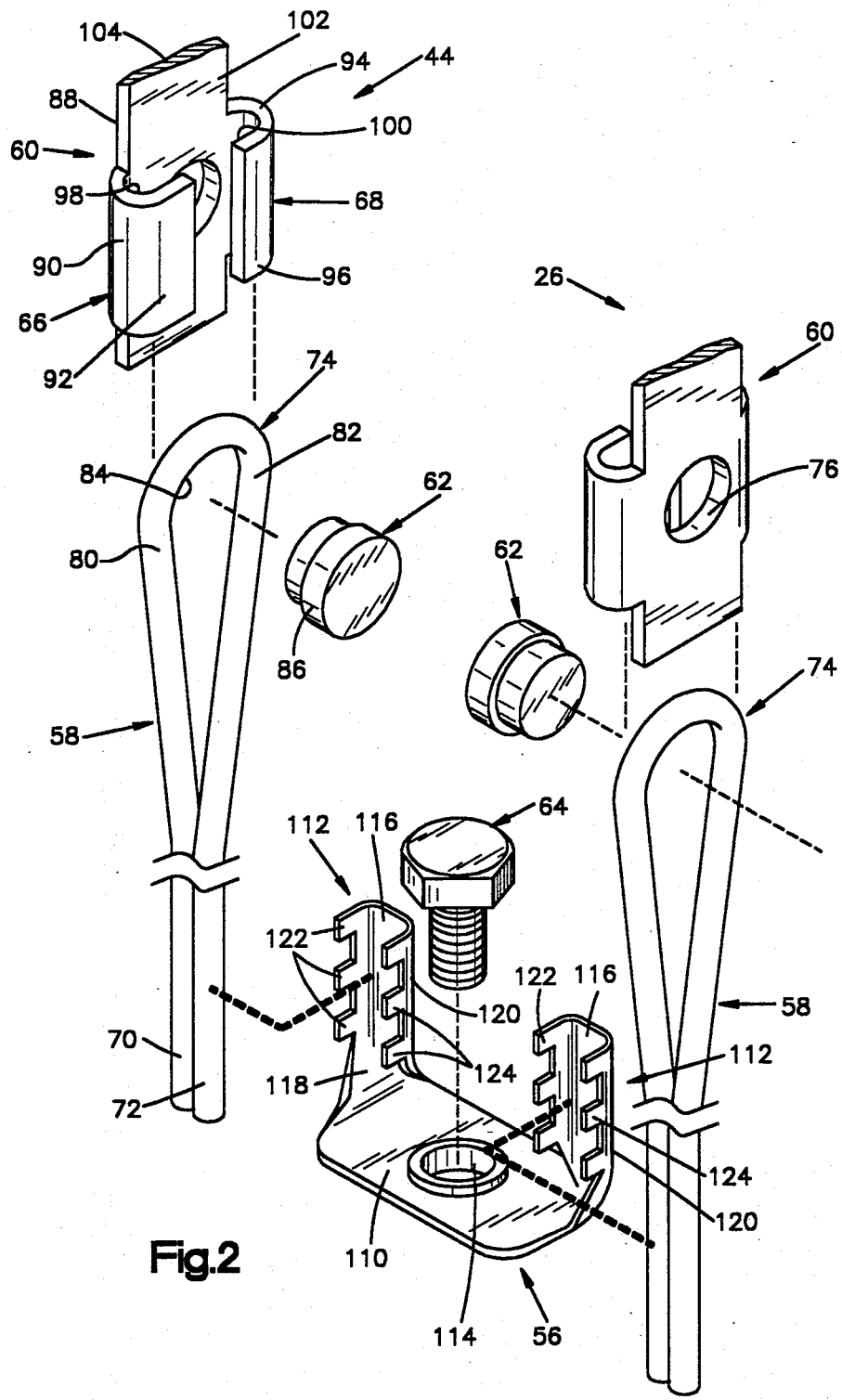
FIG. 2 is an exploded perspective view of a safety belt apparatus in accordance with the present invention.

FIG. 1 illustrates schematically a vehicle front bench seat 10. The seat 10 has three occupant seating positions, for a driver, a center passenger, and a right side passenger. The seat is located on a vehicle floor structure 12. Each of the three occupant seating positions has its own separate seat belt system.

The driver seating position has a three-point continuous loop seat belt system 14 including a length of belt webbing 16. The webbing 16 extends from a floor mounted retractor 18 through a D-ring 20, through an adjustable tongue assembly 22, and is anchored at an anchorage point 24 to the vehicle structure 12. The tongue assembly 22 is connectable with a buckle 26 which is connected in a force-transmitting relationship to the vehicle floor structure 12.

The right side passenger seating position also has a three-point continuous loop system 30 which is generally similar to the driver side system 14. The system 30 includes a length of belt webbing 32 extending from a floor mounted retractor 34, passing through a D-ring 36, through an adjust tongue 38, and anchored at a floor anchorage point 40. The adjust tongue 38 is connectable with a buckle 42 which is connected in a force-transmitting relationship to the vehicle floor structure 12.

The center occupant seating position has a lap belt restraint system with no retractor. The lap belt restraint system includes a buckle 44 anchored at anchorage point 52 to the vehicle floor. The buckle 44 is connectable to a tongue 46. The tongue 46 is fixed to the end of a length of lap belt webbing 48 which is attached to the floor at an anchorage point 50. The anchorage point 50 for the lap belt 48 may be the same anchorage point as is used for the buckle 42 for the right side passenger seating position. In a similar manner, the anchorage point 52 for the center occupant buckle 44 may be the same anchorage point as is used for the driver side buckle 26.

FIG. 3 illustrates an assembly 54 for attaching the buckle 44 and the buckle 26 to the vehicle floor 12. The assembly 54 includes a floor attachment plate 56, at least one cable 58, at least one buckle base plate 60, and at least one rivet 62. The buckle base plate 60 is the base plate of a seat belt buckle which is preferably a conventional end release buckle. When the tongue 46 is attached to the buckle 44, the forces transmitted to the webbing 48 will be transmitted through the tongue 46 to the base plate 60. When an occupant tends to move forward against the belt webbing 48, as in an accident, tensile forces are transmitted from the belt webbing 48 through the tongue assembly 46 through the buckle 44 and into the buckle base plate 60. The tensile forces are then transmitted through the rivet 62 which is attached to the base plate 60, through the cable 58 into the attachment plate 56 and thence into the vehicle structure to which the attachment plate 56 is attached by means of, for example, a bolt 64.

The buckle base plate 60 includes a pair of flange portions 66 and 68 which form channels for receiving a portion of the cable 58. The cable 58 is preferably one continuous length of stranded galvanized steel cable having a first end portion 70, a second end portion 72, and a loop portion 74 located intermediate the end portions 70 and 72. Opposite portions 80 and 82 of the cable loop 74 are received in the channels 66 and 68, respectively. The cable loop 74 extends about the rivet 62, and the channels or flange portions 66 and 68 retain the cable in position relative to the rivet 62. The rivet 62 extends through an opening 76 in the buckle base plate 60 and is secured to the base plate 60.

The cable loop 74 has a generally circular inner periphery 84. The rivet 62 has an outer peripheral surface 86 which is approximately the same size as the inner peripheral surface 84 of the cable loop 74. The rivet 62 is thus designed to interfit closely with the cable loop 74 when in the position shown in FIG. 3.

The base plate 60 includes a planar base portion 88 and the first and second flange portions 66 and 68 projecting from the planar base portion 88. The flange portions 66 and 68 define the cable receiving channels with the planar base portion 88. The flange portion 66 includes a side wall portion 90 and a top wall portion 92. The flange 66 has an inner curved peripheral surface 98. The flange 68 also includes a side wall portion 94 and a top wall portion 96. The flange 68 has an inner curved peripheral surface 100. The flanges 66 and 68 extend longitudinally along the buckle base plate 60, that is, in the direction in which tensile forces are transmitted.

The planar base portion 88 of the buckle base 60 has a first major side surface 102 and a second major side surface 104. The rivet 62 extends through the opening 76 in the planar base portion 88. The rivet 62 has a first portion 106 (FIG. 4) for engaging the first major side surface 102 of the planar base portion 88. The rivet has a second portion 108 which engages the second major side surface 104 of the planar base portion 88. The first rivet portion 106 contacts the first major side surface 102. The rivet portion 108 is upset to extend radially outwardly of the opening 76 to engage the second major side surface 104 of the buckle base plate, thereby fixedly securing the rivet 62 to the buckle base plate 60. Accordingly, tensile forces which are transmitted into the buckle base plate 60 are transmitted also through the rivet 62.

Once the rivet 62 is attached to the base plate 60, the channel portions 66 and 68 retain the cable 58 against the rivet 62 and block movement of the cable away from the rivet 62. The channel side walls 90 and 94 block movement of the cable relative to the base plate in a direction parallel to the plane of the planar base portion 88 and transverse to the direction of transmission of tensile forces. The channel top walls 92 and 96 retain the cable loop 74 in position relative to the base plate 60 and block movement of the cable loop 74 in a direction normal to the plane of the planar base portion 88. Thus, the cable loop 74 is retained in engagement with the first major side surface 102 of the planar base portion 88 of the base plate 60.

To assemble the assembly 54, the cable 58 is slid longitudinally along the buckle base plate 60 so that the opposite loop portions 80 and 82 are received in the channels defined by the flange portions 66 and 68. The loop portion 80 is located in the channel defined by the top wall 92, side wall 90, and the planar base portion 88 of buckle base 60. The loop portion 80 may engage the inner peripheral surface 98 of the flange portion 66. The second opposite loop portion 82 is received in the channel defined by the top wall 96, the side wall 94, and the planar base portion 88 of the buckle base 60. The loop portion 82 may engage the inner peripheral surface 100 of the flange portion 68. Because the cable 58 is formed with a circular cross section, the inner peripheral surfaces 98 and 100 preferably have a circular configuration corresponding to the circular cross section of the cable 58.

When the opposite loop portions 80 and 82 have been correctly positioned relative to the buckle base plate 60, the loop 74 extends about the periphery of the opening 76 in the base plate 60. The rivet 62 is inserted through the loop 74 and through the opening 76. The rivet 62 may then be secured to the base plate 60 by upsetting portion 108 of the rivet 62.

The end portions 70 and 72 of the cable 58 are fixedly secured to the attachment plate 56 for transmitting tensile forces between the cable 58 and the attachment plate 56. The attachment plate 56 includes a base planar portion 110 and a channel portion 112 extending from the base planar portion 110. The base planar portion 110 has an opening 114 therethrough. The fastener 64 extends through the opening 114. The fastener 64 may be, for example, a threaded bolt received in a corresponding threaded opening in the vehicle structure 12. When the cable end portions 70 and 72 are clamped in the channel portion 112 of attachment plate 56, tensile forces are transmitted from the cable 58 through the attachment plate 110, the fastener 64, and thus into the vehicle structure 12.

The channel portion 112 of the attachment plate 56 includes a bottom wall 116 and a pair of opposite side walls 118 and 120. A plurality of projections 122 extend from the first side wall 118. A plurality of projections 124 extend from the second side wall 120. The cable end portions 70 and 72 are inserted into the channel defined by the channel bottom wall 116 and the channel side walls 118 and 120. The projections 122 and 124 are bent over and clamped tightly against the cable end portions 70 and 72, respectively. The projections 122 clamp the cable end portion 70 against the channel bottom wall 116 and against the side wall 118. The projections 124 clamp the cable end portion 72 against the channel bottom wall 116 and against the side wall 120. The projections clamp the cable end portions against the channel bottom wall with sufficient strength so that the cable 58 is not pulled out of the attachment plate 56 under any tensile load which will be encountered in normal operation of the vehicle.

In the embodiment of FIG. 5, the buckles 44 and 26, each including a buckle base plate 60, are fixedly secured by a pair of cables 58 to one attachment plate 56. The attachment plate 56 includes a pair of channel portions 112 for receiving the end portions of the two cables 58.

As indicated schematically in FIG. 5, each buckle 44 and 26 preferably has a cover 130, preferably formed of plastic. The cover 130 covers the operative parts of the buckle, including the buckle base plate 60, and the rivet 62, and the connection between the base plate 60 the cable 58. A sheath or tube 132, also preferably made of plastic, covers the cable end portions 70 and 72 of the cable 58 and the channel portion 112. The remainder of the attachment plate 56, along with the fastener 64, may optionally be covered also.

The attachment plate 56 is preferably made from a high tensile low alloy steel. The attachment plate 56 is of a simple form which may be stamped from steel strip and plated. The attachment plate 56 can be manufactured in conventional progressive dies, without the necessity for hot or cold forging or heat treating. The buckle base plate 60 is also simple and efficient in construction. The planar base portion 88 which extends from the remainder of the buckle (not shown) need only have the opening 76 formed therethrough and the flange portions 66 and 68 formed thereon. The buckle base plate 60 is then ready to have the cable loops 74 and the rivet 62 inserted therein.

As shown schematically in FIG. 1, an attachment plate may be secured at the location 50 to the vehicle structure 12 where the length of belt webbing 48 is secured to the vehicle structure. The length of belt webbing 48 is attached at its end to the attachment plate. The attachment plate is secured to the vehicle structure 12 by means of a fastener.

Figure 7:
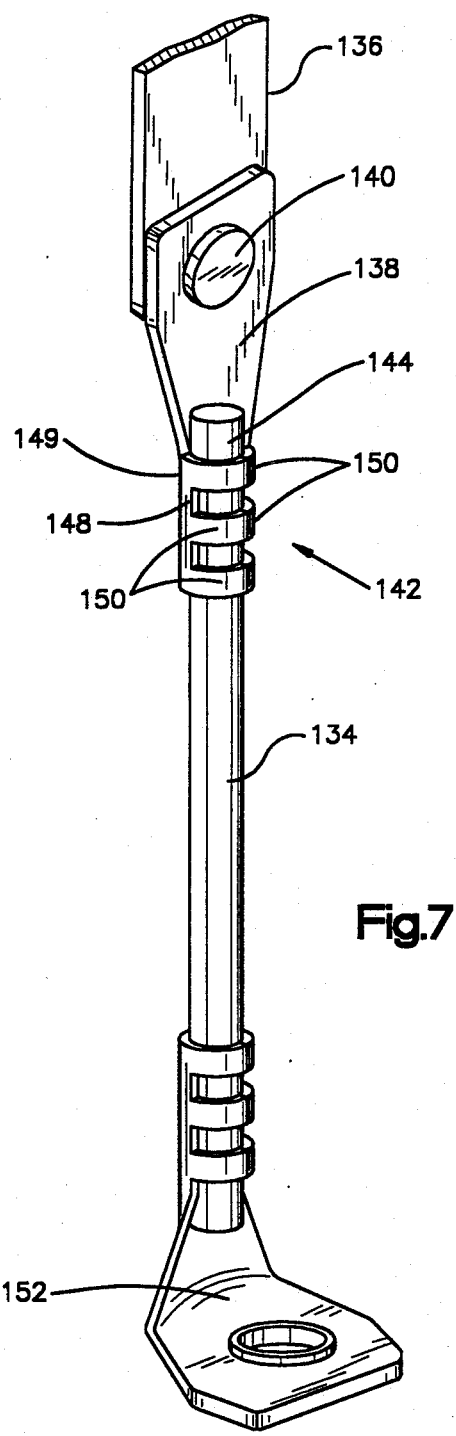
FIG. 7 is a view of a third embodiment of the invention.

In a second embodiment shown in FIG. 6, only one buckle is attached to the vehicle structure 12. In the embodiment of FIG. 6, the attachment plate 56 includes only one channel portion 112. In a third embodiment shown in FIG. 7, a single cable strand 134 is used to attach a buckle structure 136 to the vehicle structure. An attachment plate 138 is connected to the buckle structure 136 by a rivet 140. The attachment plate 138 has a channel 142 for receiving an end portion 144 of the cable 134. The channel 142 has a pair of side walls as in the embodiment of FIG. 3 and a bottom wall 149. Only one side wall is shown and is designated 148. A plurality of projections 150 extending from the side walls 146 and 148 clamp the cable end portion 144 to the bottom wall of the channel 142 and thus attach the cable 134 to the buckle structure 136. The single cable strand 134 is connected to the vehicle structure by an attachment plate 152. The attachment plate 152 is similar to the attachment plate 56 shown in FIG. 3 but receives only the single cable strand 134 rather than the two cable end portions 70 and 72 as in the embodiment of FIGS. 1–6 in which the cable has a loop attached to the buckle structure.

From the above description of preferred embodiments of the invention, those skilled in the art will perceive improvements, changes and modifications. Such improvements, changes and modifications within the skill of the art are intended to be covered by the appended claims.

Having described our invention, we claim:

1. Apparatus comprising:
a seat belt buckle having a base plate, said base plate having means defining facing channels;
a cable having a loop intermediate its ends and parallel extending end portions, opposite portions of said loop being located in said channels; and
a member for transmitting force acting on said buckle to said cable, said member being attached to said base plate and located in said loop and having surface portions engageable with said loop, said channels retaining said opposite portions of said loop against said member.

2. An apparatus as defined in claim 1 wherein said channels extend in a first direction along said base plate and said force is transmitted in said first direction.

3. An apparatus as defined in claim 2 wherein each of said channels is C-shaped and said base plate includes a planar base portion and first and second opposite flange portions projecting from said planar base portion and defining said channels with said planar base portion.

4. An apparatus as defined in claim 3 wherein each of said flange portions includes a side wall portion and a top wall portion, said member retaining said cable loop in position relative to said base plate in said first direction, said side wall portion retaining said cable loop in position relative to said base plate and blocking movement of said cable loop in a second direction parallel to the plane of said planar base portion and transverse to said first direction, said top wall retaining said cable loop in position relative to said base plate and blocking movement of said cable loop in a third direction normal to the plane of said planar base portion.

5. An apparatus as defined in claim 4 wherein said flange portions and said member retain said cable in engagement with a first major side surface of said planar base portion of said base plate.

6. An apparatus as defined in claim 5 wherein said member is a rivet having a first portion for engaging said first major side surface of said planar base portion and a second portion which is upset to engage a second major side surface of said planar base portion to attach said rivet to said base plate.

7. An apparatus as defined in claim 1 wherein said base plate includes surface means defining a circular opening in said base plate, said member being circular and extending through said opening and having a circular outer peripheral surface, and said cable loop extends around said circular member and engages said outer peripheral surface of said member.

8. An apparatus as defined in claim 7 wherein said channels are located on opposite sides of said opening in said base plate and said cable extends through one of said channels, around said member, and through the other one of said channels.

9. An apparatus as defined in claim 1 wherein each of said channels has a generally circular cross-section and said cable has a generally circular cross-section.

10. Apparatus comprising
a cable for connection to a seat belt buckle;
an attachment plate for connection with said cable, said attachment plate having a channel for receiving an end portion of said cable, said channel having a bottom wall;
a plurality of projections on said attachment plate clamping said end portion of said cable against said channel bottom wall to fixedly secure said cable to said attachment plate; and
means to fixedly connect said attachment plate to a vehicle structure to thereby transmit force from said cable through said attachment plate to the vehicle structure.

11. An apparatus as defined in claim 10 wherein said attachment plate includes a base planar portion having means defining an opening therein, and a fastener for extending through said opening in said planar base portion to fasten said attachment plate to the vehicle structure.

12. An apparatus as defined in claim 10 wherein said channel includes a pair of opposite side walls on opposite sides of said end portion of said cable, and a plurality of projections extending from each of said opposite side walls.

13. An apparatus as defined in claim 10 wherein said cable includes a pair of parallel extending end portions received in said channel.

14. An apparatus as define in claim 13 wherein said channel includes a pair of opposite side walls on opposite sides of said end portions of said cable, and a plurality of projections extending from each of said opposite side walls, the projections extending from one of said side walls clamping one of said cable end portions against said channel bottom wall, the projections extending from the other of said side walls clamping the other of said cable end portions against said channel bottom wall.

15. An apparatus as defined in claim 10 including a second cable for connection to a second seat belt buckle, said attachment plate including a second channel for receiving an end portion of said second cable, said second cable being fixedly secured to said attachment plate.

16. Apparatus comprising:
a seat belt buckle having a base plate, said base plate having means defining facing first and second channels;
a cable having a loop intermediate its ends and parallel extending end portions, opposite portions of said loop being located in said first and second channels, respectively;
a member for transmitting force acting on said buckle to said cable, said member being attached to said base plate and located in said loop and having surface portions engageable with said loop, said first and second channels retaining said opposite portions of said loop against said member;
an attachment plate for connection with said parallel extending end portions of said cable, said attachment plate having a third channel for receiving said end portions of said cable, said third channel having a bottom wall;
a plurality of projections on said attachment plate clamping said end portions of said cable against said third channel bottom wall to fixedly secure said cable to said attachment plate; and
means to fixedly connect said attachment plate to a vehicle structure to thereby transmit force from said cable through said attachment plate to the vehicle structure.

17. Apparatus comprising
a cable for connection to a seat belt buckle structure and to a vehicle structure;
an attachment plate for connection with said cable, said attachment plate having a channel for receiving an end portion of said cable, said channel having a bottom wall;
a plurality of projections on said attachment plate clamping said end portion of said cable against said channel bottom wall to fixedly secure said cable to said attachment plate; and
means to fixedly connect said attachment plate to one of the structures.

18. An apparatus as defined in claim 17 wherein said channel includes a pair of opposite side walls on opposite sides of said end portion of said cable, and said plurality of projections extend from each of said opposite side walls.

19. Apparatus as defined in claim 17 wherein said attachment plate is for attachment to the vehicle structure and further including another attachment plate connected to said buckle structure, said another attachment plate having another channel for receiving another end portion of said cable, said another channel having another pair of opposite side walls on opposite sides of said another end portion of said cable, and a plurality of projections extending from at least one of said opposite side walls of said another pair of side walls clamping said another end of said cable against said another channel.

* * * * *